United States Patent Office 3,449,443
Patented June 10, 1969

3,449,443
METHOD FOR SELECTIVELY BROMINATING PHENOLS
Andrew J. Dietzler and Kenneth B. Bradley, Midland, Mich., assignors to The Dow Chemical Company, Midland, Mich., a corporation of Delaware
No Drawing. Continuation-in-part of application Ser. No. 134,865, Aug. 30, 1961. This application May 31, 1966, Ser. No. 553,645
Int. Cl. C07c 37/00, 39/24
U.S. Cl. 260—623                    14 Claims

ABSTRACT OF THE DISCLOSURE

The present invention concerns the selective ortho bromination of an ortho, para H phenol by reaction at −20° to about 70° C. of the phenol with bromine chloride in the presence of an inert organic solvent for about 0.25 to 5 hours.

Cross reference to related application

The present application is a continuation-in-part of our earlier filed application Ser. No. 134,865, filed Aug. 30, 1961, now abandoned.

It has now been found that a para unsubstituted aromatic hydroxyl compound having at least one hydrogen in the ortho position (e.g., a phenolic compound having the para and at least one ortho position unsubstituted and free of substituents reactive under the conditions of reaction) can be selectively brominated in the ortho position with bromine chloride in the presence of an inert organic solvent at a temperature of from about −20° to about 70° C. Thus one can brominate a phenolic compound having the following general formula

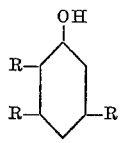

wherein each R represents a member independently selected from the group consisting of hydrogen, alkyl, aryl, aralkyl, and halogen, especially chlorine and bromine.

Good yields are obtained when the bromine chloride is employed in a proportion of from about 0.2 to 1.3 moles per mole of phenol and preferably in about an equivalent proportion. The substitution proceeds readily with good yields at temperatures of from about −20° to about 70° C. The employment of temperatures below about −20° C. results in decreased yields of 2 or 6 brominated products although some of the desired brominated product can be obtained. At temperatures much above 70° the degree of chlorination increases to the detriment of bromination. The amount of solvent used is critical, each solvent has a commercial optimum solvent-to-phenol ratio whereby the maximum yield of the ortho-bromo-phenol is obtained.

The contact or reaction time varies somewhat with the temperature, nature of the phenol, the solvent and the like. However, contact times of from about 0.25 to 5 hours have proven to be satisfactory. The preferred contact time varies from about 0.5 to 3.5 hours. The reaction is conveniently carried out with mild agitation, although agitation is not essential to the production of the desired ortho-bromo-phenols.

The phenolic compounds which can be selectively brominated in accordance with the present invention are those hydroxy aromatic compounds of the benzene series having at least one reactive hydrogen in either or both ortho positions and in the para position. It is to be understood that selectivity is attendant only when the para position and at least one ortho position is unsubstituted. Representative of the phenols which fall within the former and can be employed to obtain selective bromination are: phenol, o-chlorophenol, o-bromophenol, m-chlorophenl, m-bromophenol, 3,5-dichlorophenol, 3,5-dibromophenol, o-cresol, m-cresol, 2-chloro-m-cresol, 2-bromo-m-cresol, 5-chloro-m-cresol, 5-bromo-m-cresol, 6-chloro-m-cresol, 6-bromo-m-cresol, 2,3-xylenol, 2,5-xylenol, 3,5-xylenol, m-phenylphenol, o-phenylphenol, o-ethylphenol, and the like.

The inert solvents which can be employed in accordance with the present invention include the polychlorinated saturated hydrocarbon and the cycloaliphatic aromatic and chlorinated aromatic hydrocarbon solvents. Thus, one can employ chloroform, carbon tetrachloride, bromotrichloroethane, perchloroethylene, hexane, cyclohexane, benzene, chlorobenzene, dichlorobenzenes and the like.

The following examples illustrate the present invention but are not to be construed as limiting:

EXAMPLE 1

Bromination of o-chlorophenol with bromine chloride

One mole of bromine (160 g.) was weighed into 400 ml. (638 g., 4.15 moles) of carbon tetrachloride. This solution was cooled to 0° C. and 71 g. (1 mole) of chlorine was bubbled in at 0° to 1° C. over a 1 hour period. This resulting bromine chloride solution was then added dropwise to a solution of 257.2 g. (2 moles) of o-chlorophenol in 1220 ml. (1950 g., 12.7 moles) of CCl₄ at 23–26° C. over a 2.8 hour period with stirring. The reaction mixture was stirred for 0.5 hour longer and let stand overnight.

The reaction mixture was washed five times with 300 ml. portions of water and then distilled and the fractions analyzed. There was thus obtained:

|  | Weight in grams | Moles | Yield, percent |
| --- | --- | --- | --- |
| o-Chlorophenol | 19.3 | 0.15 |  |
| 2-bromo-6-chlorophenol | 283.2 | 1.368 | 74 |
| 4-bromo-2-chlorophenol | 84.6 | 0.41 | 22 |
| Dibromochlorophenol | 11.3 | 0.04 | 2 |

The ratio of 2-bromo-6-chlorophenol to 4-bromo-2-chlorophenol was 3.3 to 1.

When the experiment of Example 1 was repeated except that the bromination reaction was conducted at 0–3° C. instead of 23–26° C. the ratio of 2-bromo-6-chlorophenol to 4-bromo-2-chlorophenol was 1.7 to 1.

EXAMPLE 2

Bromination of o-chlorophenol in benzene with bromine chloride

In the runs made in benzene solvent the bromine chloride was made up in CCl₄ and this solution added to the benzene solution of the o-chlorophenol. This procedure was used because there was some evidence of reaction of Br-Cl with benzene at high concentrations in benzene.

One half mole (80 g.) of bromine was weighed into 80 g. (0.52 mole) of CCl₄. This solution was cooled to 0° C. and 35.5 g. (0.5 mole) of chlorine was bubbled into the solution over a 40-minute period. The resulting solution was then added dropwise at 22–28° C. over a 2-hour period to a solution of 128.6 g. (1 mole) of o-chlorophenol in 1270 g. (16.3 moles) of benzene. The mixture was thereafter stirred for an additional hour while maintaining the solution at about 25° C.

The reaction mixture above was washed five times with 250 ml. portions of water and distilled thru a ¾″ x 18″ Vigreux column to a head temperature of 50° C. at 25 mm. to remove the solvent. The product (residue), wt.

198 g., contained 11% by weight of o-chlorophenol, 71% 2-bromo-6-chlorophenol, and 18% of 4-bromo-2-chlorophenol. The ratio of 2-bromo-6-chlorophenol to 4-bromo-2-chlorophenol was 3.9 to 1.

EXAMPLE 3

Bromination of o-chlorophenol with bromine chloride in other solvents

In the table below is shown the results obtained in the bromination of o-chlorophenol in other solvents. These runs were made in the manner as described in the previous examples employing a solvent to o-chlorophenol mole ratio of about 8.15 to 1. In all cases equal molar quantities of bromine chloride and o-chlorophenol were used. Reaction temperature was 25° C.

| Solvent: | Ratio 2-bromo-6-chlorophenol to 4-bromo-2-chlorophenol |
|---|---|
| Bromotrichloromethane | 3.6 |
| Propylene dichloride | 0.79 |
| Cyclohexane | 3.4 |
| Chlorobenzene | 3.3 |
| o-Dichlorobenzene | 1.8 |
| Chloroform | 1.9 |

EXAMPLE 4

Effect of temperature on the bromination of o-chlorophenol with bromine chloride in $CCl_4$ solution The runs shown below were made in $CCl_4$ solution using equal molar quantities of Br-Cl and o-chlorophenol and about 8 moles of $CCl_4$ per mole of o-chlorophenol.

| Temp. ° C.: | Ratio 2-bromo-6-chlorophenol to 4-bromo-2-chlorophenol |
|---|---|
| −17 to −25 | 0.7 |
| 0 to 1 | 1.7 |
| 6 to 9 | 1.5 |
| 23 to 26 | 3.3 |
| 38 to 40 | 3.1 |
| 58 to 63 | 2.1 |

There was indication of slight chlorination at 40° C. and 60° C.

EXAMPLE 5

Effect of o-chlorophenol concentration in solvents on the 2-bromo-6-chlorophenol to 4-bromo-2-chlorophenol ratio In the table below is shown the effect of the o-chlorophenol concentration on the ratio of the 2-bromo-6-chlorophenol to 4-bromo-2-chlorophenol. In all these runs equal molar quantities of Br-Cl and o-chlorophenol were used.

| Solvent | Temp., ° C. | Molar ratio solvent to chlorophenol | Ratio 2-bromo-6-chlorophenol to 4-bromo-2-chlorophenol |
|---|---|---|---|
| $CCl_4$ | 0 | 4.75 | 1.15 |
| $CCl_4$ | 0 | 8.4 | 1.7 |
| $CCl_4$ | 0 | 16.8 | 0.86 |
| $CCl_4$ | 0 | 75.4 | 0.28 |
| $CCl_4$ | 25 | 2.5 | 0.84 |
| $CCl_4$ | 25 | 8.4 | 3.3 |
| $CCl_4$ | 25 | 16.8 | 2.3 |
| $CCl_4$ | 25 | 78.0 | 1.1 |
| $CHCl_3$ | 25 | 1.7 | 0.3 |
| $CHCl_3$ | 25 | 6.3 | 0.2 |
| $CHCl_3$ | 25 | 8.4 | 1.9 |
| $CHCl_3$ | 25 | 14.6 | 3.7 |
| $CHCl_3$ | 25 | 20.0 | 3.1 |
| $CHCl_3$ | 25 | 40.0 | 3.2 |
| $CHCl_3$ | 25 | 80.0 | 4.2 |
| Benzene | 25 | 4.1 | 0.8 |
| Do | 25 | 8.2 | 3.9 |
| Do | 25 | 16.3 | 3.9 |
| Do | 25 | 20.0 | 4.4 |
| Do | 25 | 40.0 | 4.1 |
| Do | 25 | 80.0 | 4.9 |
| $CH_2Cl_2$ | 25 | 8.4 | 0.21 |
| $CH_2Cl_2$ | 25 | 14.6 | 0.22 |

EXAMPLE 6

2,6-dibromophenol o-Bromophenol, 346 g. (2 moles), F.P. 5.6° C., was dissolved in 1685 g. (10.95 moles) of $CCl_4$ and cooled to 0° C. To this solution with stirring at +0.5° to −2° C. was added a solution of 2 moles of BrCl in 640 g., 4.16 moles, of $CCl_4$ in 2 hours. The mixture was maintained at +0.5 to −1° C. with stirring for 4.25 hours and then let stand overnight at about 25° C. The reaction mixture was then washed five times with 250 ml. portions of water to remove the HCl.

The oil layer was then distilled thru a ¾" x 18" Vigreux column at atmospheric pressure to a pot temperature of 130° C. to remove most of the $CCl_4$. The last of the $CCl_4$ was removed by distillation to a head temperature of 50° C. at 25 mm. of Hg pressure. A light tan-colored residue, 493 g., of crude bromophenols was obtained. Infrared analysis showed this material to contain, 6% o-bromophenol, 35% 2,4-dibromophenol, and 59% 2,6-dibromophenol. The ratio of 2,6-dibromophenol to 2,4-dibromophenol was 1.69 to 1.

EXAMPLE 7

Bromination of phenol with Br-Cl in $CCl_4$

One mole, 160 g., of bromine was dissolved in 639 g. (4.15 moles) of $CCl_4$. Chlorine, 71 g. (1 mole) was bubbled in at 0° to 2.5° C. with stirring in 0.6 hour. This solution was added dropwise to a solution of 188.2 g. (2 moles) of phenol in 1940 g. (12.6 moles) of $CCl_4$ at 24–26° C. in 2.5 hours with stirring. This reaction mixture was let stand overnight.

The reaction mixture was washed five times with 325 ml. portions of water and the oily layer distilled over lead phosphate to a head temperature of 51°/25 mm. to remove the solvent. 308 g. of product was obtained which contained 5% phenol, 15% 2,4-dibromophenol, 28% o-bromophenol and 52% p-bromophenol.

EXAMPLE 8

Bromination of o-cresol with Br-Cl in $CCl_4$

One mole, 71 g., of chlorine was added to a solution of 160 g. (1 mole) of bromine in 638 g. (4.15 moles) of $CCl_4$ at −1 to 2.5° C. in 1.25 hours with stirring. This solution was added dropwise to a solution of 216 g. (2 moles) of o-cresol in 1680 g. (11 moles) of $CCl_4$ at −1 to 0° C. in 3 hours. The reaction product was washed with water as before and distilled through a ¾" x 18" Vigreux. 353 g. of product, B.P. 82–132°/10 mm. Hg was obtained. This product contained 11% o-cresol, 61% 4-bromo-o-cresol, and 28% 6-bromo-o-cresol.

EXAMPLE 9

Bromination of o-tert.-butylphenol with Br-Cl in $CCl_4$

Two moles of o-tert.-butylphenol were brominated with 2 moles of Br-Cl in the same manner as Example 8. In this run 433 g. of product, B.P. 98–147° C. at 10 mm. Hg was obtained. This product contained 15% o-tert.-butylphenol, 50% 4-bromo-2-tert.-butylphenol and 35% of 2-bromo-6-tert.-butylphenol.

EXAMPLE 10

Bromination of o-phenylphenol with Br-Cl in $CCl_4$

One mole of o-phenylphenol was brominated with one mole of Br-Cl in the same manner as Example 8. 233 g. of product, B.P. 139°/7 mm. Hg was obtained. This product contained 15% o-phenylphenol, 65% 4-bromo-2-phenylphenol and 22% 6-bromo-2-phenylphenol.

EXAMPLE 11

Bromination of m-cresol

One half mole of bromine (80 g.) was weighed into 80 g. (0.5 mole) of carbon tetrachloride. This solution was cooled to 0° C. and 35.5 g. (0.5 mole) of chlorine was bubbled in 32 minutes at −4° to 2° C. This resulting bromine chloride solution was then added dropwise with stirring to a solution of 108.1 g. (1 mole) of m-cresol in 1215 g. (7.9 moles) of carbon tetrachloride at 23–27° C. in 2 hours. The reaction mixture was stirred for 1 hour longer and then let stand overnight.

The reaction mixture was washed five times with 300 ml. portions of water and then distilled and the fractions analyzed. There was thus obtained:

| | Weight in grams | Moles | Percent yield |
|---|---|---|---|
| m-Cresol | 23.8 | 0.22 | |
| 2-bromo-m-cresol, 6-bromo-m-cresol | 48.8 | 0.26 | 33.5 |
| 4-bromo-m-cresol | 54.1 | 0.29 | 37.1 |
| Dibromo-m-cresol | 42.3 | 0.16 | 27.0 |

Ratio o-bromo to p-bromo 0.9.

When bromination was run as above but using $Br_2$, the ratio of ortho to para was 0.3.

We claim:

1. A process for mono orthobrominating phenolic compounds having the formula

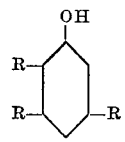

wherein each R is independently selected from the group consisting of hydrogen, alkyl, aryl, aralkyl and halogen which consists essentially of reacting at a temperature of from about −20° to about 70° C. one molar equivalent of bromine chloride with a phenolic compound having the formula set forth above in the presence of an inert organic solvent selected from the group consisting of polychlorinated saturated hydrocarbons, cycloaliphatic hydrocarbons, aromatic hypdrocarbons, and chlorinated aromatic hydrocarbons said solvent being employed to provide from 1.7 to 80 moles of solvent per mole of phenolic reactant, said reaction being carried out by contacting 0.2 to 1.3 moles of bromine chloride per mole of phenolic compound and isolating the monobrominated products.

2. The process of claim 1 wherein said phenolic compound is phenol.

3. The process of claim 1 wherein said phenolic compound is o-chlorophenol.

4. The process of claim 1 wherein said phenolic compound is o-bromophenol.

5. The process of claim 1 wherein said phenolic compound is o-cresol.

6. The process of claim 1 wherein said phenolic compound is o-tert.-butylphenol.

7. The process of claim 1 wherein said phenolic compound is o-phenylphenol.

8. The process of claim 1 wherein said solvent is carbon tetrachloride.

9. The process of claim 1 wherein said solvent is cyclohexane.

10. The process of claim 1 wherein said solvent is chloroform.

11. The process of claim 1 wherein said solvent is benzene.

12. The process of claim 1 wherein said solvent is chlorobenzene.

13. The process of claim 1 wherein said solvent is ortho dichlorobenzene.

14. The process of claim 1 wherein said bromine chloride is employed in an amount of from 0.8 to about 1.2 moles per mole of phenolic.

References Cited

UNITED STATES PATENTS

| 2,607,802 | 8/1952 | Britton et al. | 260—623 |
| 3,012,035 | 12/1961 | Knowles et al. | 260—623 |
| 3,143,576 | 8/1964 | Kovacic | 260—623 |

BERNARD HELFIN, *Primary Examiner.*

W. B. LONE, *Assistant Examiner.*